United States Patent
Hudson et al.

(10) Patent No.: US 10,730,391 B2
(45) Date of Patent: Aug. 4, 2020

(54) CONTROL OF REDUNDANT POWER ARCHITECTURE FOR A VEHICLE

(71) Applicant: FORD GLOBAL TECHNOLOGIES, LLC, Dearborn, MI (US)

(72) Inventors: Andrew Hudson, Sterling Heights, MI (US); Hamed Babazadehrokni, Livonia, MI (US); John Anthony Demarco, Lake Orion, MI (US); Farouq Mozip, Dearborn, MI (US); David Celinske, Wolverine Lake, MI (US); David Jeffeory Berels, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 509 days.

(21) Appl. No.: 15/434,924

(22) Filed: Feb. 16, 2017

(65) Prior Publication Data
US 2018/0229609 A1    Aug. 16, 2018

(51) Int. Cl.
| | |
|---|---|
| *B60L 3/00* | (2019.01) |
| *B60L 1/00* | (2006.01) |
| *B60R 16/03* | (2006.01) |
| *B60L 58/21* | (2019.01) |
| *B60L 58/20* | (2019.01) |
| *B60L 58/12* | (2019.01) |

(52) U.S. Cl.
CPC ............... *B60L 3/0069* (2013.01); *B60L 1/00* (2013.01); *B60L 3/0092* (2013.01); *B60L 58/12* (2019.02); *B60L 58/20* (2019.02); *B60L 58/21* (2019.02); *B60R 16/03* (2013.01)

(58) Field of Classification Search
USPC .................................................. 307/10.1, 126
See application file for complete search history.

(56) References Cited

U.S. PATENT DOCUMENTS

| | | | |
|---|---|---|---|
| 4,015,171 | A | 3/1977 | Miller |
| 4,812,672 | A | 3/1989 | Cowan et al. |
| 5,027,002 | A | 6/1991 | Thornton |
| 5,598,041 | A | 1/1997 | Willis |
| 5,654,859 | A | 8/1997 | Shi |
| 5,745,356 | A | 4/1998 | Tassitino, Jr. et al. |
| 7,960,861 | B2 * | 6/2011 | Gscheidle ............... H02J 1/108 307/43 |
| 8,644,997 | B2 | 2/2014 | Lillis et al. |
| 8,868,249 | B2 | 10/2014 | Li |
| 8,891,211 | B2 | 11/2014 | Dent |
| 9,973,082 | B1 * | 5/2018 | Nakagawa ............... H02M 3/07 |
| 2011/0095601 | A1 | 4/2011 | Johansson |
| 2014/0035372 | A1 | 2/2014 | Normoyle et al. |
| 2014/0368160 | A1 * | 12/2014 | Reichow ................... H02J 1/08 320/107 |

(Continued)

Primary Examiner — Michael R. Fin
(74) Attorney, Agent, or Firm — David B. Kelley; Brooks Kushman P.C.

(57) ABSTRACT

A power distribution system for a vehicle includes a switching circuit configured to selectively enable power flow between a first bus and a second bus operable within a common voltage range. The power distribution system further includes a controller programmed to, in response to power flow being inactive and a current flowing through the first bus exceeding a current threshold, operate the switching circuit to enable power flow from the second bus to the first bus.

16 Claims, 4 Drawing Sheets

(56) References Cited

U.S. PATENT DOCUMENTS

| | | | |
|---|---|---|---|
| 2015/0001925 A1* | 1/2015 | Rebholz | F02N 11/0866 |
| | | | 307/10.1 |
| 2015/0192973 A1* | 7/2015 | Hintz | H02J 7/0054 |
| | | | 307/80 |
| 2015/0353109 A1 | 12/2015 | Foerster et al. | |
| 2016/0023739 A1 | 1/2016 | Brennan et al. | |
| 2017/0001535 A1* | 1/2017 | Dulle | B60L 58/12 |
| 2017/0005571 A1* | 1/2017 | Wang | H03K 5/1252 |
| 2017/0201094 A1* | 7/2017 | Hassan | H02J 3/36 |

* cited by examiner

CONTROL OF REDUNDANT POWER ARCHITECTURE FOR A VEHICLE

TECHNICAL FIELD

This application generally relates to power distribution systems for automotive vehicles.

BACKGROUND

Automotive vehicles rely on low-voltage power to support a variety of electrical devices. Traditional vehicle power distribution systems rely on a single power bus to provide power to all of the electrical devices. As such, any electrical device can affect the operation of the single power bus. For example, a short circuit condition in an electrical device may decrease the voltage to an unsatisfactory level. Such voltage fluctuations can impact the performance of other electrical components and systems.

SUMMARY

A vehicle includes a first bus and a second bus configured to operate within a common voltage range. The vehicle further includes a power distribution circuit configured to selectively enable power transfer between the first bus and the second bus. The vehicle further includes a controller programmed to enable power transfer between the first bus and the second bus according to a power transfer request derived from a first bus current and a second bus current.

A power distribution system for a vehicle includes a switching circuit configured to selectively enable power flow between a first bus and a second bus operable within a common voltage range. The power distribution system further includes a controller programmed to, in response to power flow being inactive and a current flowing through the first bus exceeding a current threshold, operate the switching circuit to enable power flow from the second bus to the first bus.

A method includes operating a switching circuit that is configured to selectively enable power flow between a first bus and a second bus operating within a common voltage range to enable power flow from the second bus to the first bus in response to power flow being inactive and a current flowing through the first bus exceeding a current threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
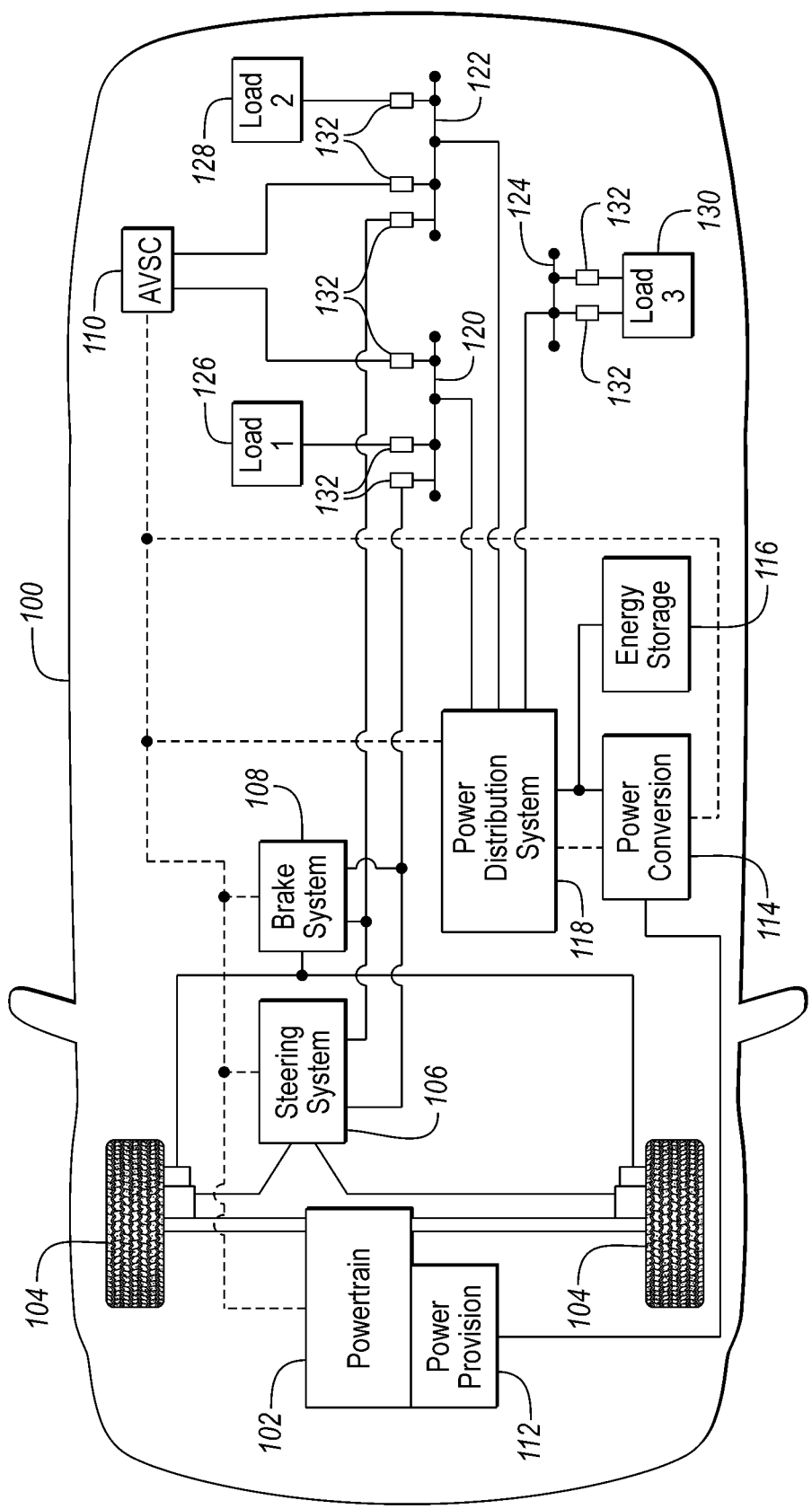
FIG. 1 depicts a possible configuration for a vehicle with autonomous driving features.

FIG. 1 depicts a vehicle 100 configured with autonomous driving features. For example, the vehicle 100 is capable of controlling powertrain, steering, and braking functions to autonomously drive the vehicle 100. The vehicle 100 may include a powertrain 102 that is configured to provide motive power to drive wheels 104. The powertrain 102 may include conventional powertrains such as an internal combustion or diesel engine coupled with a transmission. The powertrain 102 may include an all-electric powertrain that includes an electric machine and a traction battery. The powertrain 102 may be a hybrid powertrain including an internal combustion or diesel engine, a traction battery, one or more electric machines, and a hybrid transmission or gearbox. The powertrain 102 may include one or more powertrain controllers that are configured to control and monitor operation of the powertrain 102.

The vehicle 100 may include a steering system 106 that is configured to control a direction of the vehicle 100. For example, the steering system 106 may be a rack and pinion system. The steering system 106 may be hydraulically actuated, electrically actuated, or some combination thereof. The steering system 106 may include power assist devices. The steering system 106 includes linkages between the wheels 104 and the steering mechanism. The steering system 106 may be coupled to a steering control device (e.g., a steering wheel) that allows driver control of the steering system 106. The steering system 106 may include one or more steering system controllers that are configured to control and monitor operation of the steering system 106. The steering system 106 may include actuators and feedback devices for steering the vehicle 100 without the aid of driver input. For an autonomous vehicle, the steering system 106 may be responsive to steering commands from a vehicle controller. The steering system 106 may be configured to operate the steering mechanism to achieve the steering commands.

The vehicle 100 may include a braking system 108 that is configured to control deceleration of the vehicle 100. The braking system 108 may include braking modules at each of the wheels 104. For example, the braking modules may be disc brake or drum brake mechanisms. The braking system 108 may be hydraulically actuated, electrically actuated, or some combination thereof. The braking system 106 may interface with a braking control device (e.g., brake pedal) that allows driver control of the braking system 108. The braking system 106 may include one or more braking system controllers that are configured to control and monitor operation of the braking system 108. The braking system 108 may include actuators and feedback devices for braking the vehicle 100 without the aid of driver input. The braking system 108 may incorporate hardware and software components for implementing anti-lock braking, traction control, and stability control functions. For an autonomous vehicle, the braking system 106 may be responsive to braking commands from the vehicle controller. The braking system 106 may be configured to operate the braking modules to achieve the braking commands.

The vehicle 100 may include one or more autonomous vehicle system components 110 (AVSC). The AVSC 110 may include components that are utilized for autonomous driving functions. The AVSC 110 may include a plurality of electronic modules and devices. The AVSC 110 may be in communication with other controllers (e.g., powertrain controllers, steering system controllers, and braking system controllers). The AVSC 110 may include sensors and actuators for implementing autonomous driving features. For example, the AVSC 110 may include one or modules that include radar, vehicle speed, acceleration, yaw rate, and communication sensors. The AVSC 110 may include such components as a collision avoidance system and an adaptive cruise control system. The AVSC 110 may include a vehicle controller to coordinate the various electronic modules related to autonomous vehicle functions.

The vehicle 100 may include an electrical power provision system 112. The electrical power provision system 112 may include one or more electric machines that operate as generators. The electric machines may be part of the powertrain 102 and provide propulsive and regenerative power. In some configurations, the electric machines may be mechanically coupled to rotating elements of the powertrain 102 and provide electrical energy only (e.g., alternator). The power provision system 112 may be configured to convert an alternating current (AC) power to a direct current (DC) power. In hybrid or electrified powertrain configurations, a traction battery may provide a high-voltage output for the power provision system 112. For example, the power provision system 112 may output the same voltage as the traction battery (e.g., high-voltage level). In a non-hybrid powertrain configuration, one or more alternators may provide an output for the power provision system 112.

Electrical devices within the vehicle 100 may be powered by a low-voltage power supply. For example, electrical systems in a conventional automobile are powered by a 12 Volt supply. In a conventional automobile, all electrical systems are connected to a single power supply network that is connected to a 12V battery. The 12V battery supplies power to the single power network when the power provision system 112 is not providing power. When the power provision system 112 (e.g., alternator) is operating, the 12V battery may provide supplemental power during periods of high electrical demand that the power provision system 112 (e.g., alternator) may be unable to support alone. However, such systems are sensitive to problems with the single power network. For an autonomous vehicle, a power architecture that provides some redundancy may enhance availability and reliability of vehicle power system.

The vehicle 100 may include a power conversion module 114. The power conversion module 114 may include one or more DC/DC converters configured to convert an input voltage into a voltage compatible with a low-voltage power bus. The vehicle 100 may include an energy storage module 116 for storing energy for the low-voltage power bus. For example, the energy storage module may include one or more auxiliary batteries. The batteries may be lead-acid, nickel metal hydride (NIMH), and/or Lithium ion type batteries.

The vehicle 100 may include a power distribution system 118 that is configured to distribute power to a plurality of low-voltage power buses. The power distribution system 118 may distribute power provided by the power conversion system 114 and the energy storage system 116 to power buses or networks in the vehicle 100. The power distribution system 118 may be configured to selectively isolate and couple the power buses. The power buses may be comprised of conductive elements that are routed throughout the vehicle 100 and may be included in wiring harnesses. Attachment points to power buses may be via connectors or terminals. For example, a first output of the power distribution system 118 may be coupled to a first power bus 120. A second output of the power distribution system 118 may be coupled to a second power bus 122. A third output of the power distribution system 118 may be coupled to a third power bus 124. The number of power buses may vary based on the configuration. For example, in some power architecture configurations, the third power bus 124 may not be present. In these configurations, each of the vehicle electrical loads may be allocated to the first power bus 120 and the second power bus 122. The power buses may be configured to operate within a common voltage range. For example, the power buses may be configured to operate in a voltage range between 6 Volts and 20 Volts) with a nominal operating voltage of 12 Volts.

Each of the power buses (120, 122, 124) may provide power to a set of electrical loads. An electrical load set may be defined as electrical loads that are electrically coupled to a common power bus. For example, a first electrical load set 126 may be electrically coupled to the first power bus 120. A second electrical load set 128 may be electrically coupled to the second power bus 122. A third electrical load set 130 may be electrically coupled to the third power bus 130. Each of the electrical loads associated with the electrical load sets (126, 128, 130) may be coupled to the respective power bus through fuses 132. In other configurations, a group of electrical loads within the electrical load sets may be coupled to the respective power bus through fuses 132. Each of the fuses 132 may be rated to open when a current flowing through exceeds a predetermined current. The predetermined current may depend upon the particular load or loads that the fuse is protecting.

Some electrical devices may be electrically coupled to multiple power buses. For example, the AVSC 110 may be electrically coupled to the first power bus 120 and the second power bus 122. This configuration may allow the AVSC 110 to be redundantly powered. For example, in the event of a loss of power on the first power bus 120, the AVSC 110 may draw power from the second power bus 122. The AVSC 110 may route each of the power lines through a diode to a common power point (e.g., diode-or configuration). Electrical devices related to the steering system 106 and the braking system 108 may be configured in a similar manner. The power architecture is such that all components related to autonomous driving features are redundantly powered. Components that are not related to autonomous driving (e.g., infotainment, cabin comfort) may not be redundantly powered. The electrical modules that are redundantly powered may continue to operate in the event of one of the power busses being inoperative. For example, if the first power bus 120 is inoperable, the redundantly powered electrical loads will draw power from the second bus 122 and continue operation.

The optional third electrical load set 130 may represent a plurality of low-power electrical loads. The third electrical load set 130 may represent those loads having low power requirements or those loads classified as non-essential loads. The first electrical load set 126 may represent a set of high-power electrical loads. The second electrical load set 128 may represent another set of high-power electrical loads. The electrical loads for the vehicle 100 may be analyzed based on power requirements. Each of the electrical loads may be allocated to the first electrical load set 126, the second electrical load set 128, or the third electrical load set 130. The power architecture may attempt to balance the power demands of the first electrical load set 126 and the second electrical load set 128. In some configurations, the power demand may be similar for the first power bus 120 and the second power bus 122.

Figure 2:
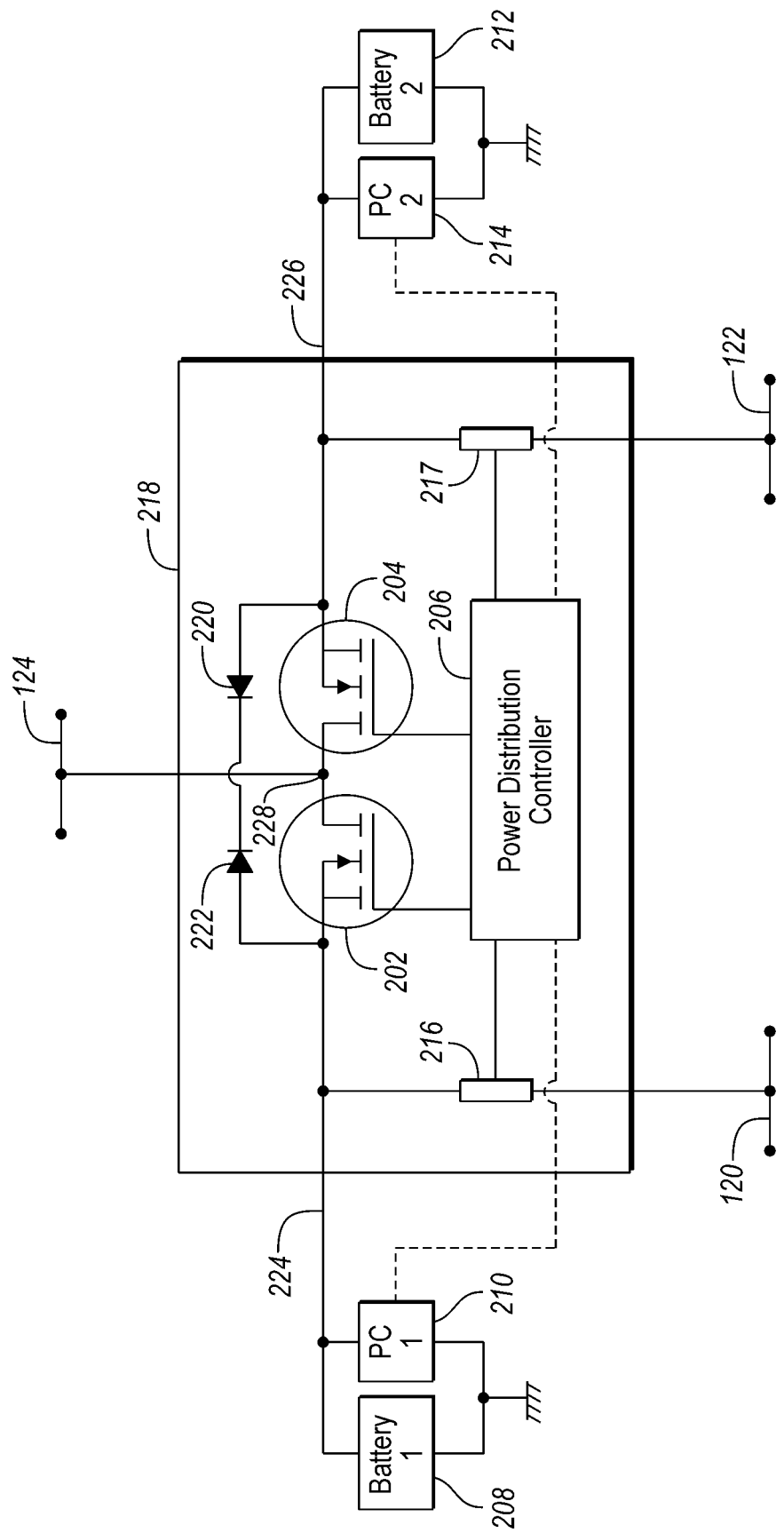
FIG. 2 depicts a possible configuration for a power distribution system.

FIG. 2 depicts a possible configuration for the power distribution system 218 for an autonomous vehicle. The power distribution system 218 may be configured to selectively isolate or couple the first power bus 120 and the second power bus 122. A first power input 224 to the power distribution system 218 may be electrically coupled to a first auxiliary battery 208 and a first power converter 210 (PC1). The first power converter 210 may convert a voltage provided by the power provision system 112 to a voltage level compatible with the first auxiliary battery 208. The power distribution system 218 may electrically couple the first power input 224 to the first power bus 120.

A second power input 226 to the power distribution system 218 may be electrically coupled to a second auxiliary battery 212 and a second power converter 214 (PC2). The second power converter 214 may convert a voltage provided by the power provision system 112 to a voltage level compatible with the second auxiliary battery 212. The power distribution system 218 may electrically couple the second power input 226 to the second power bus 122.

The first power converter 210 and the second power converter 214 may be part of the power conversion system 114. For example, a single power conversion module may be constructed that includes both the first power converter 210 and the second power converter 214. The power converters (210, 214) may be DC/DC converters that are configured to convert a traction battery voltage (e.g., 300V) to a voltage level compatible with a 12V power system.

The first auxiliary battery 208 and the second auxiliary battery 212 may be part of the energy storage system 116. For example, a single energy storage module may be constructed that includes both the first auxiliary battery 208 and the second auxiliary battery 212.

The power distribution system 218 may include a plurality of switching devices arranged in a switching circuit (or power distribution circuit) to selectively enable and/or control power flow between a plurality of power buses operating within the common voltage range. For example, the power distribution system 218 may be configured to selectively couple the first power bus 120 and the second power bus 122 to transfer power between the buses. The power distribution system 218 may include a first switching device 202 that is coupled to the first power input 224. A first diode 222 may be coupled across the first switching device 202 such that current flow through the first diode 222 is only allowed from the first power input 224. The power distribution system 218 may include a second switching device 204 that is coupled to the second power input 226. A second diode 220 may be coupled across the second switching device 204 such that current flow through the second diode 220 is only allowed from the second power input 226.

The first switching device 202 and the second switching device 204 may be solid-state devices. For example, the first switching device 202 and the second switching device 204 may be N-channel metal-oxide semiconductor field effect transistors (MOSFET). Although N-channel MOSFET devices are used in this example, other solid-state switching devices may be used. The first switching device 202 may be configured such that a source terminal of the transistor is coupled to the first power input 224. The second switching device 204 may be configured such that the source terminal of the transistor is coupled to the second power input 226. Drain terminals of the of the first switching device 202 and the second switching device 204 may be coupled together at a connection point 228. The first diode 222 may be coupled between the source terminal and drain terminal of the first switching device 202. The second diode 220 may be coupled between the source terminal and drain terminal of the second switching device 204. Gate terminals for controlling the first switching device 202 and the second switching device 204 may be electrically coupled to a power distribution controller 206.

The connection point 228 of the drain terminals of the first switching device 202 and the second switching device 204 may be coupled to a common load bus (e.g., the third power bus 124). As depicted, current flow to the common load bus is permitted from both the first power input 224 and the second power input 226 of the power distribution system 218.

The power distribution controller 206 may include circuitry to interface with the switching devices 202, 204 to cause the switching devices 202, 204 to transition between an on-state and an off-state. The on-state for a switching device may be defined as a state in which current flow is enabled through the switching device. The off-state for the switching device may be defined as a state in which current flow through the device is blocked. In the configuration using N-channel MOSFET devices, the power distribution controller 206 may include circuitry to interface with the gate terminals of the first switching device 202 and the second switching device 204. The circuitry may be configured to provide voltage and current levels for operating the N-channel MOSFET devices. In other configurations, the circuitry may be configured to interface with different technology switching devices.

As depicted, the first power bus 120 and the second power bus 122 are isolated from one another when the first switching device 202 and the second switching device 204 are both in the off-state. Power from the first auxiliary battery 208 and the first power converter 210 is provided to the first power bus 120. In addition, power from the first auxiliary battery 208 and the first power converter 210 may be provided to the third power bus 124 through the first diode 222. Power from the second auxiliary battery 212 and the second power converter 214 is provided to the second power bus 122. In addition, power from the second auxiliary battery 212 and the second power converter 214 may be provided to the third power bus 124 through the second diode 220. In the isolated state, there is no power transfer between the first power input 224 and the second power input 226. As the first power bus 120 is coupled to the first power input 224 and the second power input 226 is coupled to the second power bus 122, the first power bus 120 and the second power bus 122 are isolated from one another.

In the configuration of FIG. 2, operating the first switching device 202 in the on-state and the second switching device 204 in the off-state allows current to flow from the second power bus 122 to the first power bus 120. Current may flow through the second diode 220 and through the first switching device 202 that is operated in the on-state. In the on-state for an N-channel MOSFET, current flows from the drain terminal to the source terminal. In this mode, current demand from the first power bus 120 may be satisfied with power from the second power bus 122. This allows the first power bus 120 to draw power from the second auxiliary battery 212 and the second power converter 214. If conditions are present to prevent the current flow from the second power bus 122 to the first power bus 120, the first switching device 202 may be transitioned to the off-state.

In the configuration of FIG. 2, operating the second switching device 204 in the on-state and the first switching device 202 in the off-state allows current to flow from the first power bus 120 to the second power bus 122. Current may flow through the first diode 222 and through the second switching device 204 that is operated in the on-state. In this mode, current demand from the second power bus 122 may be satisfied with power from the first power bus 120. This allows the second power bus 122 to draw power from the first auxiliary battery 208 and the first power converter 210. If conditions are present to prevent the current flow from the first power bus 120 to the second power bus 122, the second switching device 204 may be transitioned to the off-state.

The arrangement of switching devices permits a transfer of power between power buses. Current flow is in one direction based on the operating state of the first switching device 202 and the second switching device 204. The current flow may further depend on the voltage levels of the first power bus 120 and the second power bus 122. The voltage level of the first power bus 120 may depend on operation of the first power converter 210. The voltage level of the second power bus 122 may depend on operation of the second power converter 214. The power distribution controller 206 may be in communication with the first power converter 210 and the second power converter 214. The first power converter 210 and the second power converter 214 may be configured to receive and responds to commands from the power distribution controller 206 to modify voltage and current outputs.

The power distribution system 218 may further include a first current measurement device 216 that is configured to measure a current flowing to the first power bus 120. The power distribution system 218 may further include a second current measurement device 217 that is configured to measure a current flowing to the second power bus 122. The current measurement devices may be current shunts that are in-line with the power busses. A Hall-effect current sensor may also be used. Signals from the current measurement devices may be electrically coupled to the power distribution controller 206. The power distribution controller 206 may include interface circuitry to filter and scale the signals. For example, if the current measurement device is a resistive element, the power distribution controller 206 may be configured to measure the voltage across the resistor. The current flowing may then be determined based on the voltage and resistance value of the resistive element.

The power distribution system 218 is configured to selectively couple and isolate the first power bus 120 and the second power bus 122. In addition, the power distribution system 218 is configured to enable the flow of current between the first power bus 120 and the second power bus 122. As discussed, FIG. 2 depicts one example of the power distribution system 218. Other configurations are available to achieve similar results. For example, the particular arrangement of the switching devices and diodes may be varied in a manner to achieve the same results. Further, the type of switching device may be changed while still achieving the same results.

For the configuration depicted in FIG. 2, the following operating states or modes of the power distribution system 218 may be defined. An isolated state/mode may be defined in which the first power bus 120 and the second power bus are isolated from one another. This state or mode may be achieved by operating the first switching device 202 and the second switching device 204 in the off-state. A coupled state or mode (power transfer enabled mode) may be defined when the first power bus 120 and the second power bus 122 are coupled to one another. A first coupled state may be defined when the first switching device 202 is operated in the on-state and the second switching device 204 is operated in the off-state. In the first coupled state, current flow from the second power bus 122 to the first power bus 122 is enabled. A second coupled state may be defined when the first switching device 202 is operated in the off-state and the second switching device 204 is operated in the on-state. In the second coupled state, current flow from the first power bus 120 to the second power bus 122 is enabled. The actual current flow in the coupled modes may depend on the voltage difference between the buses.

Figure 3:
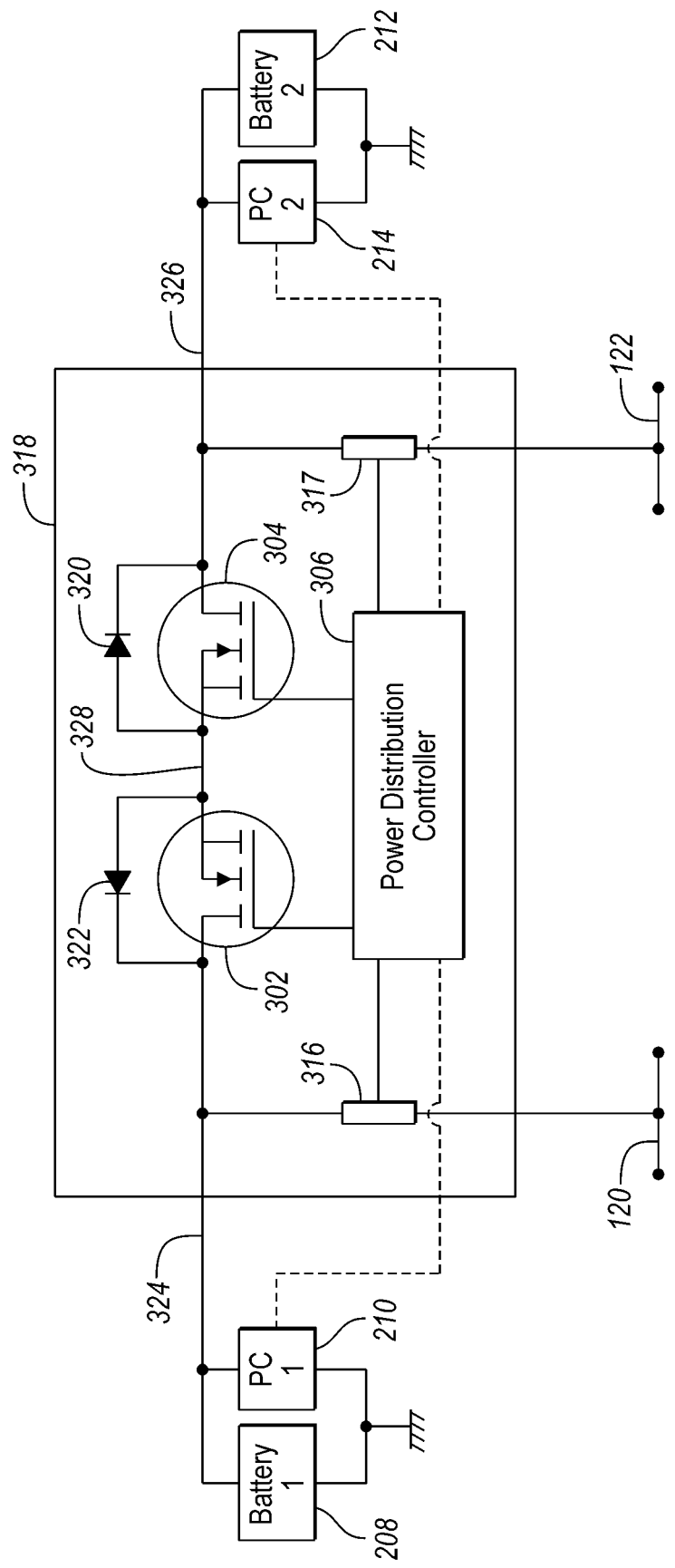
FIG. 3 depicts another possible configuration for a power distribution system.

FIG. 3 depicts an example of an another possible configuration for a power distribution system 318 that functions in a similar manner to the previously described system. Note that similarly numbered components in FIG. 2 and FIG. 3 operate in a similar manner except where specifically noted. The power distribution system 318 may be configured to selectively isolate or couple the first power bus 120 and the second power bus 122. A first power input 324 to the power distribution system 318 may be electrically coupled to the first auxiliary battery 208 and the first power converter 210 (PC1). The power distribution system 318 may electrically couple the first power input 324 to the first power bus 120.

A second power input 326 to the power distribution system 318 may be electrically coupled to the second auxiliary battery 212 and the second power converter 214 (PC2). The power distribution system 318 may electrically couple the second power input 326 to the second power bus 122.

The power distribution system 318 may include a plurality of switching devices arranged in a circuit to selectively control power flow between a plurality of power buses operating with the common voltage range. The power distribution system 318 may include a first switching device 302 that is coupled to the first power input 324. The power distribution system 318 may include a second switching device 304 that is coupled between the first switching device 302 and the second power input 326. A first diode 322 may be coupled across the first switching device 302 such that current flow through the first diode 322 is only allowed from the second switching device 304. A second diode 320 may be coupled across the second switching device 304 such that current flow through the second diode 320 is only allowed from the first switching device 302.

The first switching device 302 and the second switching device 304 may be solid-state devices. For example, the first switching device 302 and the second switching device 304 may be N-channel MOSFET devices. The first switching device 302 may be configured such that a drain terminal of the transistor is coupled to the first power input 324. The second switching device 304 may be configured such that the drain terminal of the transistor is coupled to the second power input 326. Source terminals of the of the first switching device 302 and the second switching device 304 may be coupled together at a connection point 328. The first diode 322 may be coupled between the source terminal and drain terminal of the first switching device 302. The second diode 320 may be coupled between the source terminal and drain terminal of the second switching device 304. Gate terminals for controlling the first switching device 302 and the second switching device 304 may be electrically coupled to a power distribution controller 306.

The power distribution controller 306 may include circuitry to interface with the switching devices 302, 304 to cause the switching devices 302, 304 to transition between an on-state and an off-state. In the configuration using N-channel MOSFET devices, the power distribution controller 306 may include circuitry to interface with the gate terminals of the first switching device 302 and the second switching device 304. The circuitry may be configured to provide voltage and current levels for operating the N-channel MOSFET devices. In other configurations, the circuitry may be configured to interface with different technology switching devices.

As depicted in FIG. 3, the first power bus 120 and the second power bus 122 are isolated from one another when the first switching device 302 and the second switching device 304 are both in the off-state. Power from the first auxiliary battery 208 and the first power converter 210 is provided to the first power bus 120. Power from the second auxiliary battery 212 and the second power converter 214 is provided to the second power bus 122. In the isolated state, there is no power transfer between the first power input 324 and the second power input 326. As the first power bus 120 is coupled to the first power input 324 and the second power input 326 is coupled to the second power bus 122, the first power bus 120 and the second power bus 122 are isolated from one another.

In the configuration of FIG. 3, operating the first switching device 302 in the on-state and the second switching device 304 in the off-state allows current to flow from the first power bus 120 to the second power bus 122. Current may flow through the second diode 320 and through the first switching device 302 that is operated in the on-state.

In the configuration of FIG. 3, operating the second switching device 304 in the on-state and the first switching device 302 in the off-state allows current to flow from the second power bus 122 to the first power bus 120. Current may flow through the first diode 322 and through the second switching device 304 that is operated in the on-state.

The arrangement of switching devices permits a transfer of power between power busses. Current flow is in one direction based on the operating state of the first switching device 302 and the second switching device 304. The power distribution controller 306 may be in communication with the first power converter 210 and the second power converter 214.

The power distribution system 318 may further include a first current measurement device 316 that is configured to measure a current flowing to the first power bus 120. The power distribution system 318 may further include a second current measurement device 317 that is configured to measure a current flowing to the second power bus 122.

For the configuration depicted in FIG. 3, the similar operating states or modes of the power distribution system 318 may also be defined. The isolated state/mode may be defined in which the first power bus 120 and the second power bus are isolated from one another. This state or mode may be achieved by operating the first switching device 302 and the second switching device 304 in the off-state. The coupled state/mode (power transfer enabled mode) may be defined when the first power bus 120 and the second power bus 122 are coupled to one another. The first coupled state may be defined when the first switching device 302 is operated in the off-state and the second switching device 204 is operated in the on-state. As before, in the first coupled state, current flow from the second power bus 122 to the first power bus 120 is enabled. The second coupled state may be defined when the first switching device 302 is operated in the on-state and the second switching device 304 is operated in the off-state. In the second coupled state, current flow from the first power bus 120 to the second power bus 122 is enabled.

The following description applies to any power distribution system 118 (e.g., as depicted in FIG. 2 218 or FIG. 3 318). The power distribution system 118 is operated to achieve an isolated state and one or more coupled states. The coupled states may include a first and a second coupled state that defines the direction of current flow or power flow between the power buses.

The examples that follow are described with reference to FIG. 2 but can be applied to FIG. 3 as well. For example, description of the power distribution controller 206 is applicable to FIG. 3 (306). The power distribution controller 206 may include a processor that may be programmed to implement methods and procedures for implementing the disclosed strategies. The power distribution controller 206 may also include volatile and non-volatile memory for executing program instructions and storing programs and data. The power distribution controller 206 may implement control strategies to decide when to isolate and when to couple the first power bus 120 and the second power bus 122. In some configurations, the power distribution controller 206 may be programmed to normally operate the power distribution system 218 in the isolated mode. In the isolated mode of operation, the first switching device 202 and the second switching device 204 may be operated in the off-state. In the isolated mode of operation, the first power bus 120 and the second power bus 122 are isolated from one another and operate independently from one another.

In some configurations, the power distribution controller 206 may be programmed to transition to the coupled mode (or power transfer enabled mode) of operation. The power distribution controller 206 may be programmed to enable power transfer between the first bus 120 and the second bus 122 according to a power transfer request that is derived from the first power bus current and the second power bus current. The power transfer request may include a desired direction of power flow between the first power bus 120 and the second power bus 122. For example, the power distribution controller 206 may monitor the first power bus current. If the first power bus current exceeds a predetermined power transfer threshold, the second power bus 122 may be coupled to the first power bus 120 to allow power transfer to the first power bus 120 (e.g., the first coupled state). This may be achieved by operating the first switching device 202 in the on-state. Power can then be transferred from the second auxiliary battery 212 and the second power converter 214 to the first power bus 120. The predetermined power transfer threshold may be less than a short-circuit current detection threshold.

In addition, the power distribution controller 206 may monitor the second power bus current. If the second power bus current exceeds the predetermined power transfer threshold, the first power bus 120 may be coupled to the second power bus 122 to allow power transfer to the second power bus 122 (e.g., the second coupled state). This may be achieved by operating the switching devices as described previously. Power can then be transferred from the first auxiliary battery 208 and the first power converter 210 to the second power bus 122.

Other conditions for enabling the power transfer mode of operation may include situations in which the first power converter 210 or the second power converter 214 are inoperative. That is, the power transfer request may be further derived from an operational status of the first power converter 210 and the second power converter 214. In the event of an inoperative power converter, power may be transferred from the working bus to power bus having the inoperative power converter. In addition, the power transfer mode of operation may be entered when one of the first auxiliary battery 208 or the second auxiliary battery 212 have a state of charge that is less than a predetermined state of charge threshold. The predetermined state of charge threshold may be indicative of the battery charge being at a level that is incapable of supporting a proper operating voltage. That is, the power transfer request may be further derived from a state of charge of the first auxiliary battery 208 and the second auxiliary battery 212.

The power distribution controller 206 may be in communication with the first power converter 210 and the second power converter 214. In response to determining that the power transfer enabled mode is to be entered, the power distribution controller 206 may send a request or command to the power converter of the supplying bus to increase an output voltage. For example, if the second coupled mode is to be entered, a request may be sent to the first power converter 210 to increase the voltage in anticipation of entering the coupled mode.

A short circuit condition may be detected when the current measurement associated with one of the power busses exceeds a predetermined short-circuit threshold. The predetermined current threshold may be a current level that is greater than expected operating currents for the associated power bus. The predetermined current threshold may be a current level that is indicative of a short circuit condition in one of the power buses. The predetermined current threshold may be selected such that the power distribution controller 206 can isolate the power buses in an amount of time that is less than a time for a fuse located in the power receiving bus to open. This may prevent the power supplying bus from severe voltage drops or fluctuations.

Operation of the first switching device 202 and the second switching device 204 may be based in part on the current measurement signals. For example, the power distribution controller 206 may monitor a first bus current derived from the first current measurement device 216 and a second bus current derived from the second current measurement device 217.

When the power distribution system 218 is operating in one of the coupled modes of operation, the power distribution controller 206 may monitor for a short-circuit condition in the power bus that is receiving power. The power distribution controller 206 may monitor the current flowing to the power bus that is receiving power from the other power bus. For example, in the first coupled mode of operation, the first switching device 202 may be in the on-state. In this mode, current may be flowing from the second power bus 122 to the first power bus 120. Under certain conditions, an excessive current may be drawn by the first power bus 120. For example, due to some short-circuit condition, the first power bus 120 may become shorted to ground through a low-resistance signal path. During this condition, a large current may be drawn by the first power bus 120. If the short-circuit current is present for more than a predetermined duration, an associated fuse 132 may open. However, depending on operating characteristics of the fuse 132, the duration may be long enough to permit the voltage level of the first power bus 120 to drop. Prolonged operation with the short-circuit condition could cause the voltage level of both the first power bus 120 and the second power bus 122 to drop. The power distribution controller 206 may be configured to detect the short-circuit condition and isolate the first power bus 120 from the second power bus 122 by switching the first switching device 202 to the off-state. In this mode, the short-circuit condition may only affect the first power bus 120. Electrical components that are coupled to the second power bus 122 may continue operating without impact. This includes those electrical loads having redundant power inputs such as the AVSC 110. The AVSC 110 may continue to operate through the second power bus 122.

The power distribution controller 206 may be configured to measure a voltage level of the first power bus 120 and the second power bus 122. For example, a voltage sensing circuit may be electrically coupled to first power bus 120 and the second power bus 122. The voltage sensing circuit may scale and filter an associated voltage signal to a voltage level that may be digitized by the power distribution controller 206. The power distribution controller 206 may monitor the voltage signals associated with the first power bus 120 and the second power bus 122.

The power distribution controller 206 may be configured to isolate the first power bus 120 from the second power bus 122 based on the voltage signal of the second power bus 122. For example, when the power distribution system 218 is operating in a mode to transfer power from the second power bus 122 to the first power bus 120 (e.g., first coupled mode), the first power bus 120 may be isolated from the second power bus 122 if a voltage level of the second power bus 122 falls below a predetermined voltage. The predetermined voltage may be selected as a minimum voltage level at which electrical loads connected to the second power bus 122 are configured to operate. In some configurations, the predetermined voltage may be selected as value greater than the minimum voltage level to provide a safety margin for the voltage. A similar strategy may be employed when operating in the second coupled mode of operation.

In another mode of operation, the second switching device 204 may be in the on-state. In this mode, current may be flowing from the first power bus 120 to the second power bus 122 (e.g., second coupled mode of operation). Under certain conditions, an excessive current may be drawn by the second power bus 122. For example, due to some short-circuit condition, the second power bus 122 may become shorted to ground through a low-resistance signal path. During this condition, a large current may be drawn by the second power bus 122. If the short-circuit current is present for more than a predetermined duration, an associated fuse 132 may open. In the same manner described previously, the duration may be long enough to permit the voltage level of the second power bus 122 to drop. Prolonged operation with the short-circuit condition could cause the voltage level of both the first power bus 120 and the second power bus 122 to drop. The power distribution controller 206 may be configured to detect the short-circuit condition and isolate the first power bus 120 from the second power bus 122 by switching the second switching device 204 to the off-state. In this mode, the short-circuit condition may only affect the second power bus 122. Electrical components that are coupled to the first power bus 120 may continue operating without impact.

The power distribution controller 206 may be further configured to isolate the first power bus 120 from the second power bus 122 based on the voltage signal of the first power bus 120. For example, when the power distribution system 218 is operating in a mode to transfer power from the first power bus 120 to the second power bus 122 (e.g., second coupled mode of operation), the first power bus 120 may be isolated from the second power bus 122 if a voltage level of the first power bus 120 falls below the predetermined voltage. The predetermined voltage may be selected as a minimum voltage level at which electrical loads connected to the first power bus 120 are configured to operate. In some configurations, the predetermined voltage may be selected as value greater than the minimum voltage level to provide a safety margin for the voltage.

A method for protecting redundant power buses in a vehicle may be achieved by operating the switching circuit as described herein to isolate the power buses in response to a current in the bus that is receiving current exceeding a threshold. The method may also include isolating the power buses in response to a voltage in the bus that is supplying current falling below a voltage threshold.

Figure 4:
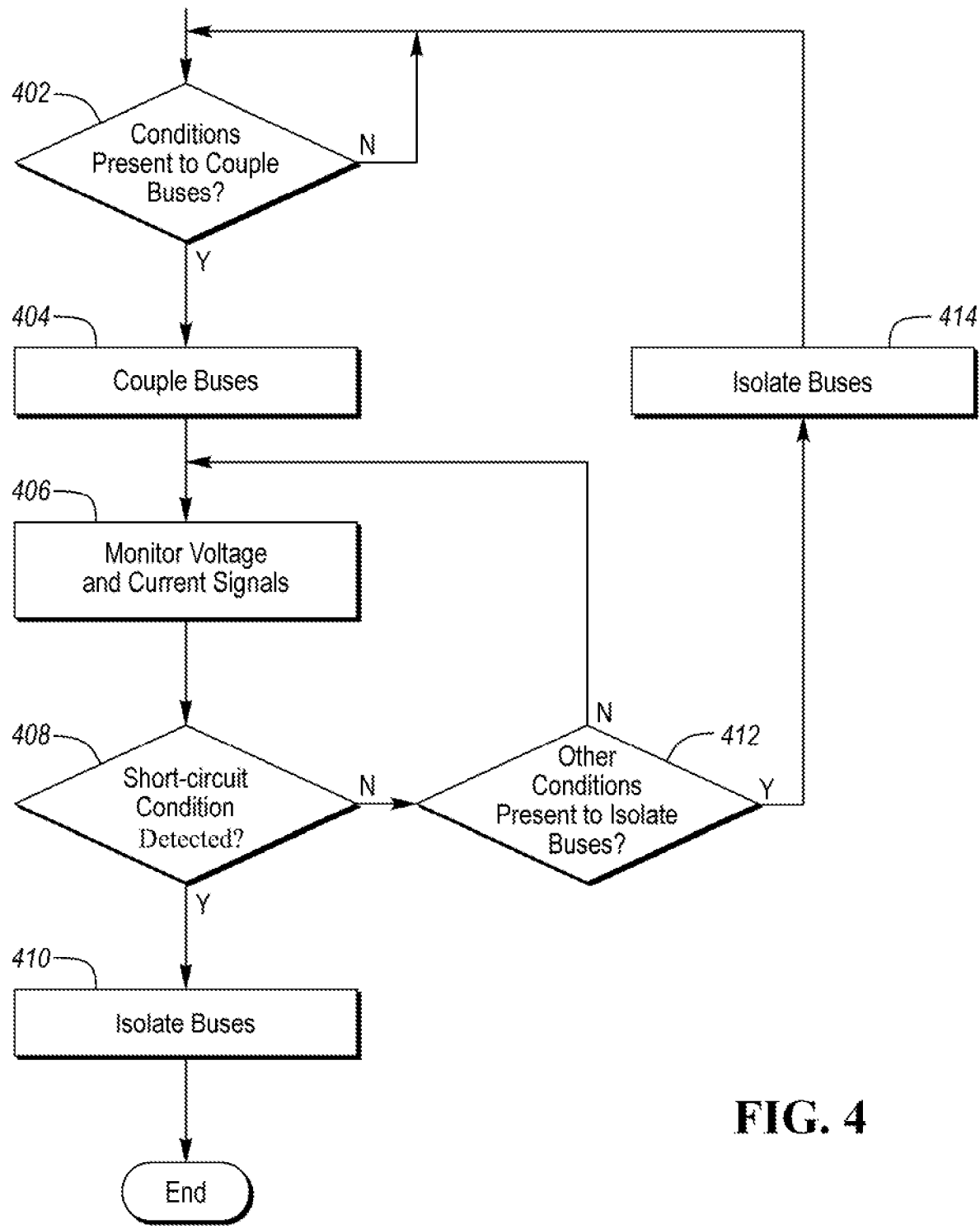
FIG. 4 depicts a flowchart for a possible sequence of operation for operating the power distribution system.

FIG. 4 depicts a flow chart that describes a possible sequence of operations that may be performed by the power distribution controller (e.g., 206). At operation 402, conditions for coupling the power buses are checked. If conditions are not present to couple the buses, operation 402 may be repeated.

If conditions are present to couple the buses, operation 404 may be performed. The conditions to couple the power buses are as previously described herein. At operation 404, the power distribution controller 206 operates the switching devices to couple the buses. For example, if it is determined that the second power bus 122 requires power, then the switching devices may be operated to achieve the second coupled mode of operation. For example, switching device 204 may be controlled in the on-state and switching device 202 may be controlled in the off-state.

At operation 406, the power distribution controller 206 monitors voltage and current signals associated with each of the power buses. At operation 408, a check is performed to identify a short-circuit condition. For example, the current signal associated with the second power bus 122 may be monitored. If the current signal exceeds a short-circuit current threshold, a short-circuit condition may be identified. In some configurations, while the buses are coupled, the current in either bus exceeding the threshold may cause the buses to be isolated. If a short-circuit condition is identified, operation 410 may be performed. At operation 410, the power distribution controller 206 operates the switching devices to isolate the power buses as previously described herein. For example, both switching devices may be operated in the off-state.

If a short-circuit condition is not identified, operation 412 may be performed. At operation 412, a check may be performed to determine if other conditions are present to isolate the power buses. For example, a vehicle shut-down condition may be a condition in which the power buses may be isolated. Other conditions, may include the current in the power buses falling below a current threshold at which each bus can support the load without aid from the other power bus. If conditions are not present for isolating the power buses, operation 406 may be repeated. That is, the system remains in the coupled condition and continues to monitor for conditions in which the buses are to be isolated.

If conditions are present to isolate the power buses, operation 414 may be performed. At operation 414, the power distribution controller 206 operates the switching devices to isolate the power buses. For example, both switching devices may be operated in the off-state. Operation 402 may then be repeated to check for conditions for coupling the buses.

Note that the specific actions of the power distribution controller (e.g., 206, 306) may depend on the configuration of switching devices. However, the operations of coupling and isolating the power buses can be performed as described above in relation to FIG. 2 and FIG. 3.

A benefit of the power distribution system 118 is that the power buses may be coupled when load conditions on one of the buses increases. During periods of increased loads, both power buses may be coupled to support the increased load. This helps to prevent the bus voltage of the heavily loaded bus from decreasing. Further, the operation of the power distribution system 118 ensures the integrity of the redundant power architecture.

A benefit of the power distribution system 118 as depicted is that short-circuit conditions are detected when the power buses are coupled. Rapidly isolating the power buses when one of the power buses is in a short-circuit condition prevents the other power bus from being affected. If the voltage level of both power busses drops to low, components having redundant power inputs may be impacted. That is, components (e.g., AVSC 110) having redundant power inputs may not be able to operate from either voltage input. Operation of the power distribution system 118 as described ensures that at least one of the power buses is maintained at proper operating voltages so that the redundantly powered components may continue operating. This is particularly beneficial for components related to implementing autonomous driving strategies. For example, if the short-circuit condition occurs while autonomously driving, it is beneficial for the autonomous driving components to remain powered and operational. Any autonomous driving maneuver that is in progress may be completed. The vehicle occupants may be provided with a warning that there is a possible issue with the affected power bus. For example, a service vehicle alert may be provided in the form of a lamp or message on a display.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a first bus and a second bus configured to operate within a common voltage range;
a power distribution circuit configured to selectively enable power transfer between the first bus and the second bus; and
a controller programmed to enable power transfer between the first bus and the second bus according to a power transfer request derived from a first bus current and a second bus current,
wherein the power distribution circuit comprises a first path between the first bus and the second bus including a first switching device and configured to selectively allow current flow from the first bus to the second bus, and a second path including a second switching device and configured to selectively allow current flow from the second bus to the first bus, and
wherein the first switching device and the second switching device are field effect transistors and the first bus is coupled to a first terminal of the first switching device and the second bus is coupled to a first terminal of the second switching device, and a second terminal of the first switching device and a second terminal of the second switching device are directly connected together to define a common terminal.

2. The vehicle of claim 1 wherein the field effect transistors are N-channel metal-oxide semiconductor field effect transistors (MOSFET), the first terminals are drain terminals, and the second terminals are source terminals.

3. The vehicle of claim 1 wherein the first path includes a first diode in series with the second switching device and the second path includes a second diode in series with the first switching device.

4. The vehicle of claim 1 wherein the power distribution circuit is further configured to isolate the first bus and the second bus when power transfer is not enabled.

5. The vehicle of claim 1 wherein the controller is programmed to enable power transfer from the first bus to the second bus in response to a current flowing through the second bus exceeding a predetermined current threshold.

6. The vehicle of claim 1 wherein the controller is programmed to enable power transfer from the second bus to the first bus in response to a current flowing through the first bus exceeding a predetermined current threshold.

7. The vehicle of claim 1 further comprising a first converter coupled to the first bus and a second converter coupled to the second bus and wherein the controller is further programmed to derive the power transfer request from an operational status of the first converter and the second converter.

8. The vehicle of claim 1 further comprising a first battery coupled to the first bus and a second battery coupled to the second bus and wherein the controller is further programmed to derive the power transfer request from a state of charge of the first battery and the second battery.

9. A power distribution system for a vehicle comprising:
a switching circuit configured to selectively enable power flow between a first bus and a second bus operable within a common voltage range; and
a controller programmed to, in response to power flow between the first bus and the second bus being inactive and a current flowing through the first bus exceeding a current threshold, operate the switching circuit to enable power flow from the second bus to the first bus,
wherein the switching circuit comprises a first path between the first bus and the second bus including a first switching device and configured to selectively allow current flow from the first bus to the second bus, and a second path including a second switching device and configured to selectively allow current flow from the second bus to the first bus, and
wherein the first switching device and the second switching device are field effect transistors and the first bus is coupled to a first terminal of the first switching device and the second bus is coupled to a first terminal of the second switching device, and a second terminal of the first switching device and a second terminal of the second switching device are directly connected together to define a common terminal.

10. The power distribution system of claim 9 wherein the controller is further programmed to, in response to power flow between the first bus and the second bus being inactive and a current flowing through the second bus exceeding the current threshold, operate the switching circuit to enable power flow from the first bus to the second bus.

11. The power distribution system of claim 9 wherein the controller is further programmed to, in response to power flow between the first bus and the second bus being inactive and a power converter coupled to the second bus being inoperable to provide power to the second bus, operate the switching circuit to enable power flow from the first bus to the second bus.

12. The power distribution system of claim 9 wherein the controller is further programmed to, in response to power flow between the first bus and the second bus being inactive and a power converter coupled to the first bus being inoperable to provide power to the first bus, operate the switching circuit to enable power flow from the second bus to the first bus.

13. The power distribution system of claim 9 wherein the controller is further programmed to, in response to power flow between the first bus and the second bus being inactive and a state of charge of a battery coupled to the second bus being less than a predetermined state of charge, operate the switching circuit to enable power flow from the first bus to the second bus.

14. The power distribution system of claim 9 wherein the controller is further programmed to, in response to power flow between the first bus and the second bus being inactive and a state of charge of a battery coupled to the first bus being less than a predetermined state of charge, operate the switching circuit to enable power flow from the second bus to the first bus.

15. The power distribution system of claim 9 wherein the switching circuit includes a first diode in parallel with a first switching device and a second diode in parallel with a second switching device arranged in series between the first bus and the second bus such that, when the power flow is enabled from the second bus to the first bus, current flows through the first diode and the second switching device.

16. The power distribution system of claim 9 wherein the field effect transistors are N-channel metal-oxide semiconductor field effect transistors (MOSFET), the first terminals are drain terminals, and the second terminals are source terminals.

\* \* \* \* \*